Figure 1:
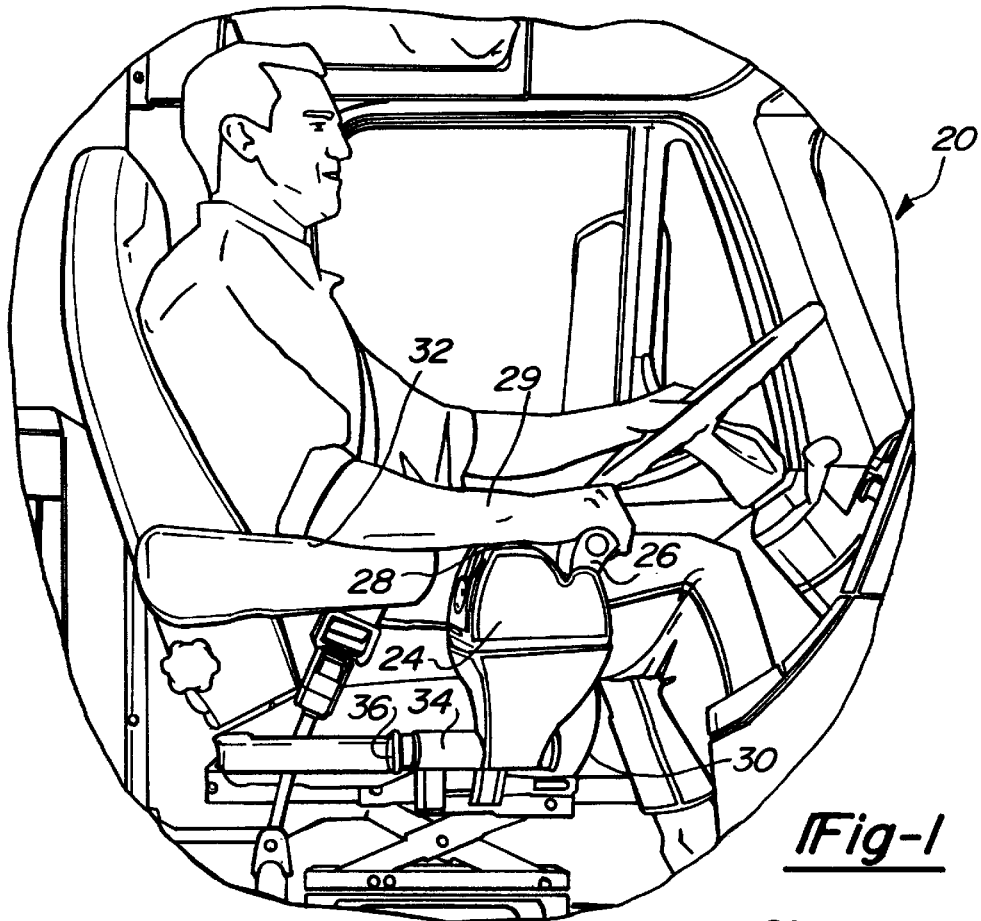
Figure 2:
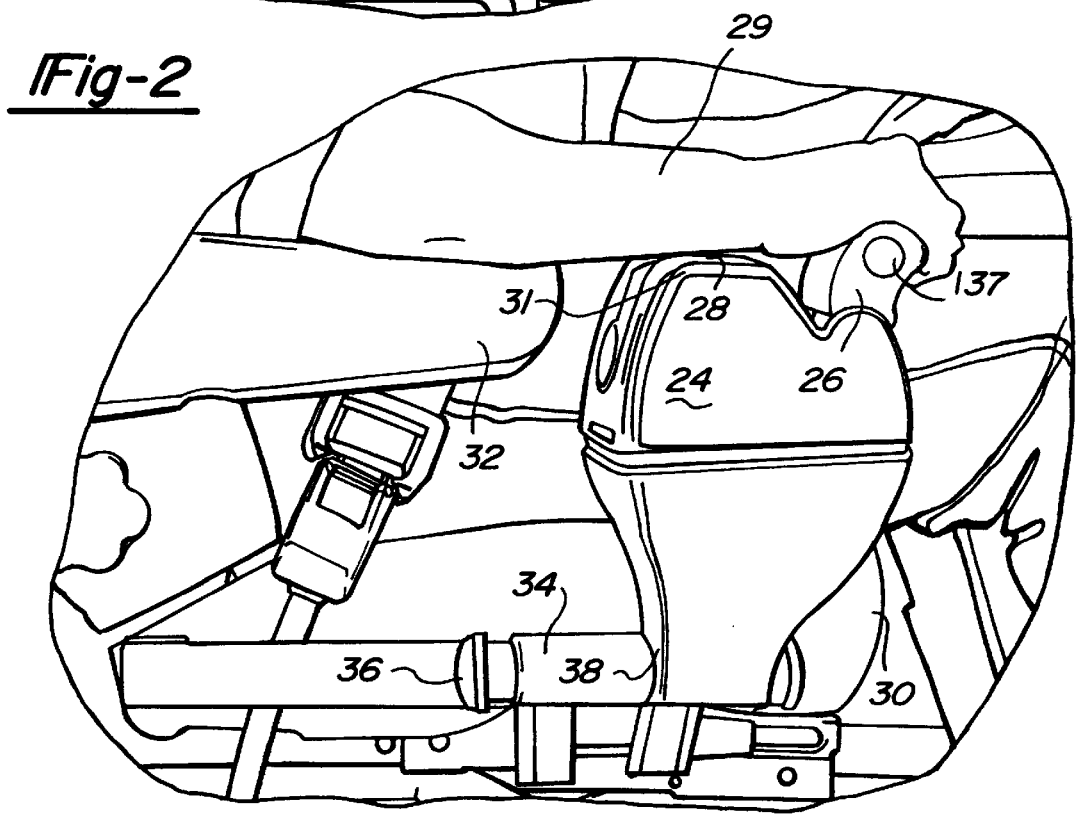
Figure 3A:
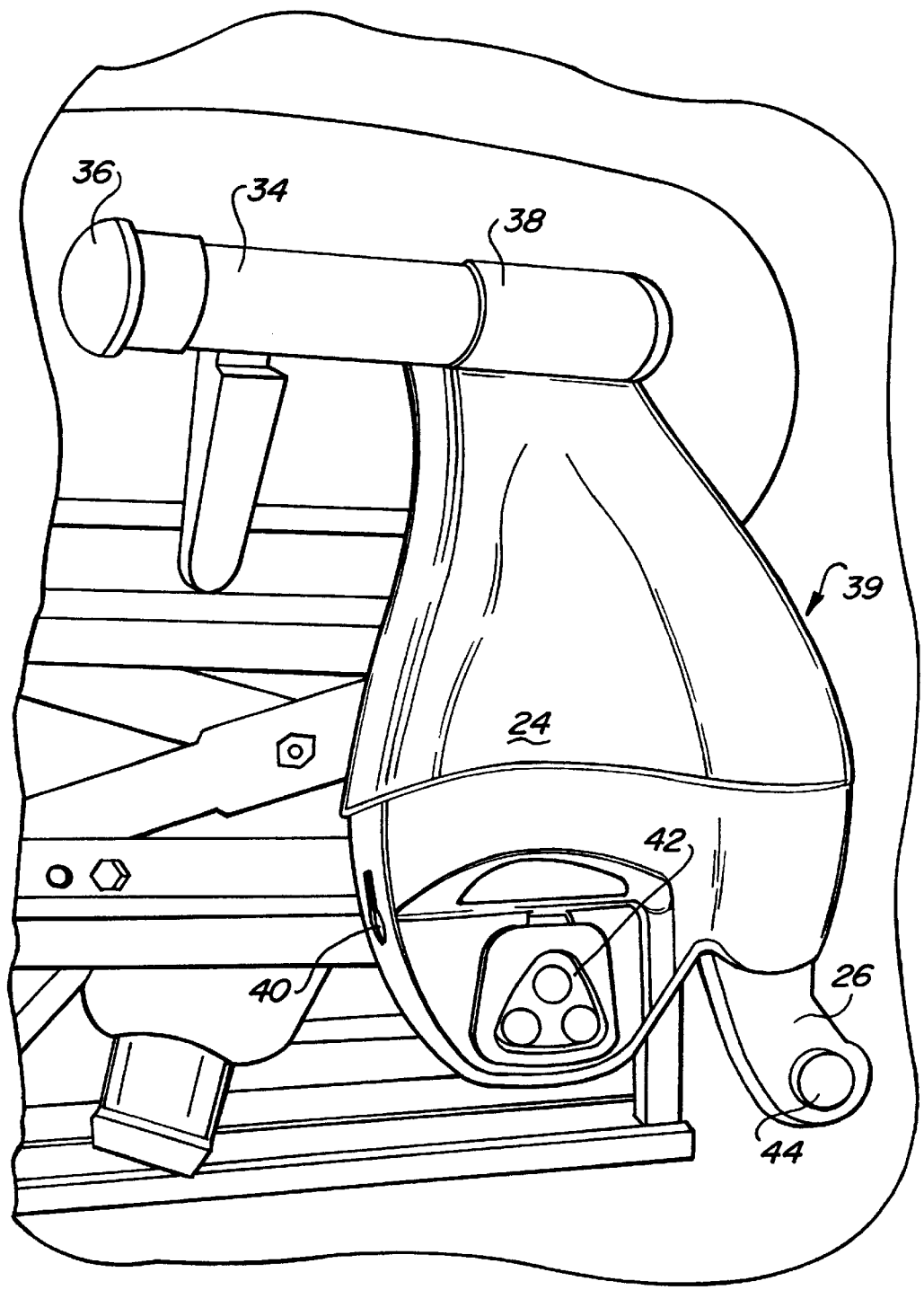
Figure 3B:
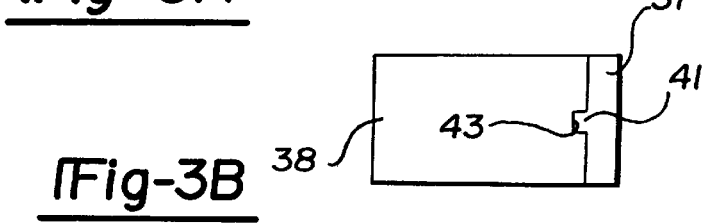
Figure 4:
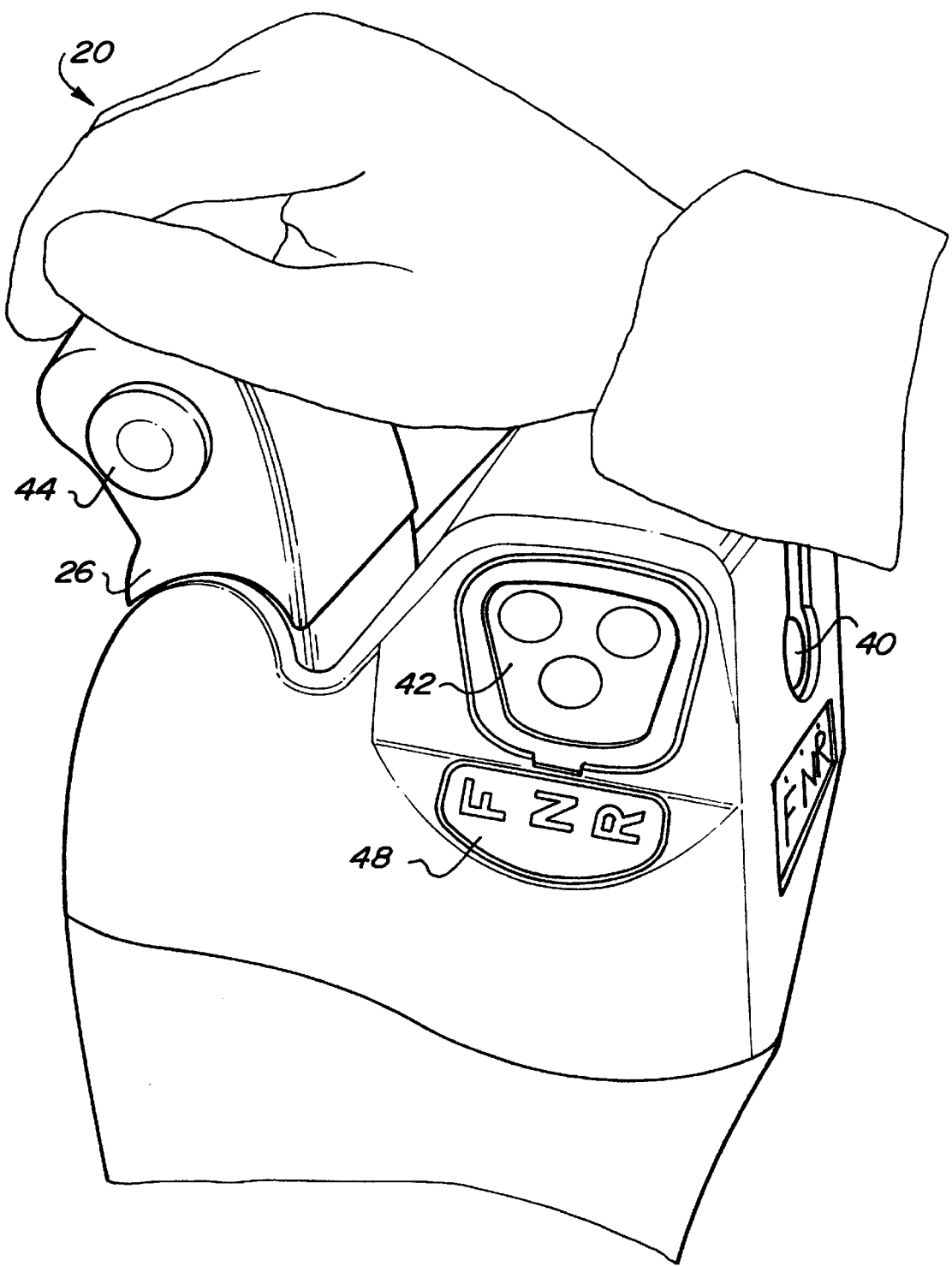

United States Patent [19]
Palmeri et al.

[11] Patent Number: 6,065,560
[45] Date of Patent: May 23, 2000

[54] SHIFT INPUT MODULE FOR AUTOMATED MANUAL SHIFT SYSTEM

[75] Inventors: Frank A. Palmeri, Troy; Charles E. Allen, Jr., Rochester Hills, both of Mich.

[73] Assignee: ZF Meritor, Laurinburg, N.C.

[21] Appl. No.: 09/039,950

[22] Filed: Mar. 16, 1998

[51] Int. Cl.⁷ ................................................ B60K 26/00
[52] U.S. Cl. ..................... 180/326; 180/334; 180/336; 74/473.1
[58] Field of Search ..................................... 180/321, 323, 180/326, 329, 333, 334, 336, 90, 170; 74/473.1, 473.35, 471 R

[56] References Cited

U.S. PATENT DOCUMENTS

| | | |
|---|---|---|
| 5,042,314 | 8/1991 | Rytter et al. ............................... 74/335 |
| 5,086,870 | 2/1992 | Bolduc ..................................... 180/333 |
| 5,161,422 | 11/1992 | Suman et al. .............................. 74/335 |
| 5,244,066 | 9/1993 | Mackoway et al. ................... 192/13 R |
| 5,261,291 | 11/1993 | Schoch et al. ........................ 74/484 R |
| 5,286,078 | 2/1994 | Mottino et al. .......................... 296/153 |
| 5,315,900 | 5/1994 | Teeter ...................................... 477/165 |
| 5,566,778 | 10/1996 | Valier et al. ............................. 180/334 |
| 5,567,004 | 10/1996 | Pietzsch ................................. 296/190 |
| 5,617,929 | 4/1997 | Richardson et al. .................... 180/326 |

*Primary Examiner*—Paul N. Dickson
*Attorney, Agent, or Firm*—Howard & Howard

[57] ABSTRACT

An improved shift input module may be moved to a stowed position where it is out of the way of a vehicle operator. This allows the operator to move easily about the cab of the vehicle. The module also carries the cruise control buttons, such that they are easily accessible.

4 Claims, 4 Drawing Sheets

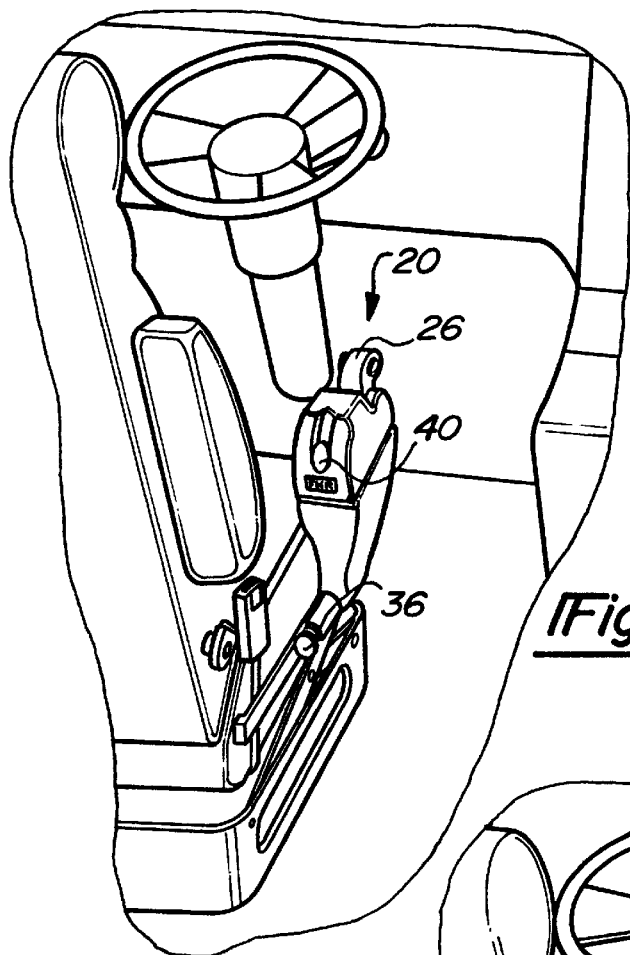
Fig-5
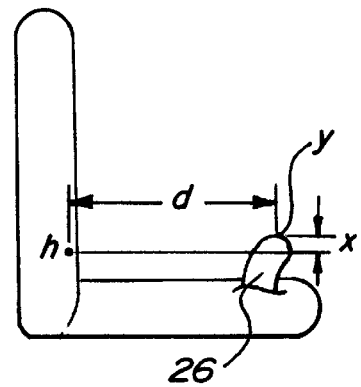
Fig-8
Fig-6
Fig-7
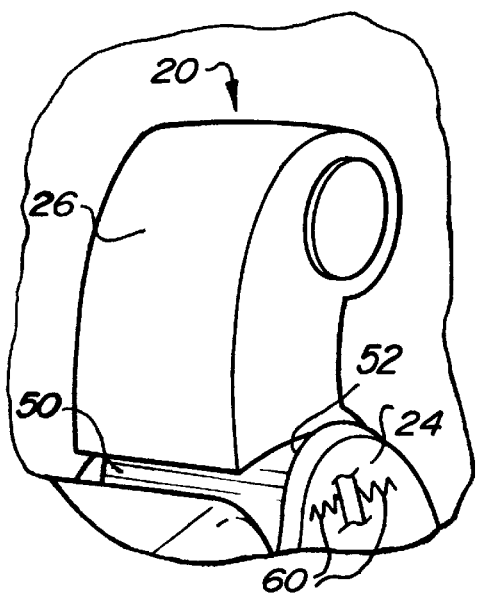
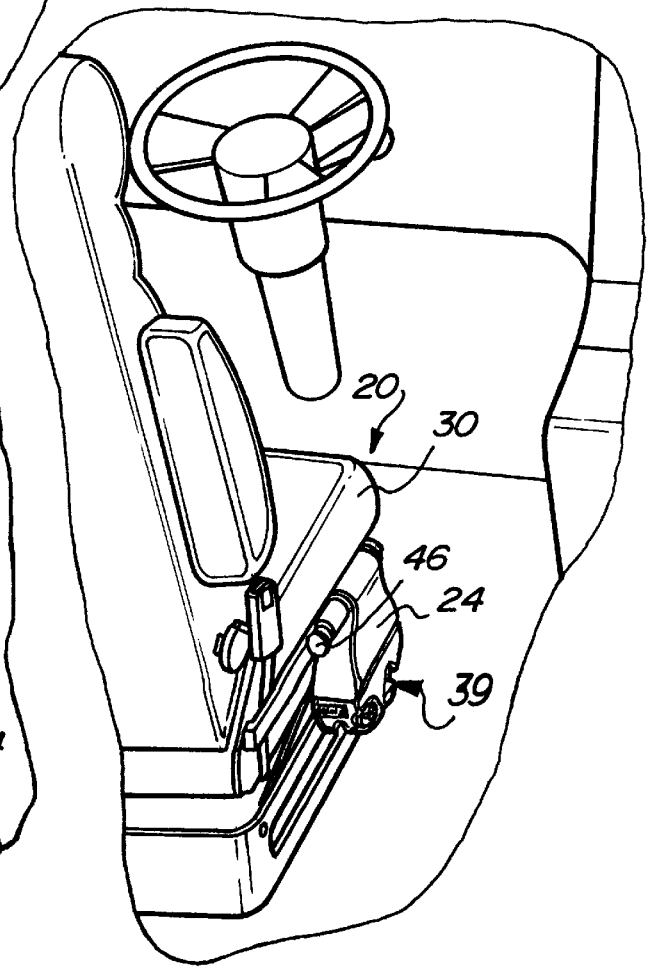

SHIFT INPUT MODULE FOR AUTOMATED MANUAL SHIFT SYSTEM

BACKGROUND OF THE INVENTION

This invention relates to an improved operator shift input module for an automated manual transmission shift system.

In the prior art, automated manual shift systems are known wherein an operator can request an upshift or a downshift by moving an input paddle. An actuator, and engine controls then take over to shift the transmission to the gear requested by the driver. These systems are becoming widely utilized as they relieve the operator of heavy vehicles of the necessity of double clutching to make a transmission shift. On the other hand, the driver is still left with the ability to choose a desired gear ratio, and thus, in some respects, these systems are more desirable then automatic transmissions. One such prior art system is disclosed in PCT published application WO 97/44210.

In the past, shift input modules have been somewhat obtrusive. The modules have been mounted in the cab of a tractor-trailer, forwardly of the operator seat. In such vehicles, the operator will often wish to move about the cab. As an example, in many cabs, the operator has a sleep chamber behind the seat. The operator thus wishes easy access from the seat to the cab. In the prior art, the input mechanisms have sometimes been in the way of the driver as the driver attempts to move about the cab.

SUMMARY OF THE INVENTION

The present invention is directed to providing a shift input module which is more convenient than the prior art. In one main aspect of this invention, the shift input module has an operative position where it extends upwardly at a location near a forward end of the operator seat. The module may be actuated to move to a stowed position. Further, this movement is independent of the arm rest. Thus, the operator is able to move easily about the cab, and the mechanism is not in the operator's way. To achieve this movement, the mechanism is provided with a simple lock mechanism. The details of the lock mechanism are not part of this invention. However, the provision of a movable transmission shift input mechanism is inventive.

Further, the inventive shift module also includes cruise control buttons adjacent the paddle. This is a location which is much more convenient then the prior art.

These and other features of the present invention can be best understood from the following specification and drawings, the following of which is a brief description.

BRIEF DESCRIPTION OF THE DRAWINGS

FIG. 1 is a side view of a vehicle cab including the inventive switch.

FIG. 2 is an enlarged view of a portion of FIG. 1.

FIG. 3A shows the improved switch in a stowed position.

FIG. 3B schematically shows a lock mechanism.

FIG. 4 is a close-up view of the inventive switch.

FIG. 5 is a rear view of the switch in the FIG. 1 operative position.

FIG. 6 is a rear view of the switch in the stowed position.

FIG. 7 is an enlarged view of one detail of the switch; and

FIG. 8 is a schematic side view of the seat and paddle.

DETAILED DESCRIPTION OF A PREFERRED EMBODIMENT

FIG. 1 shows a vehicle input shift module 20 incorporating a housing 24 with a paddle 26 and an upper platform 28.

As shown, the operator may rest a forearm 29 on platform 28. A forward end 30 of the vehicle seat is approximately positioned near the location of paddle 26. The arm rest 32 is at an approximately equal vertical location to the upper platform 28. Thus, the forearm 29 is comfortably supported on platform 28.

Module 20 is preferably incorporated into an automated transmission shift system. By moving paddle 26 forwardly or rearwardly, the operator is able to request shifts upwardly or downwardly from a currently engaged ratio.

As shown, a mount bar 34 mounts module 20 for pivotal movement. A lock release mechanism 36 allows the module to be moved to a stowed position as will be explained below. As can be appreciated from FIG. 1, in this operative position the module 20 would limit the operator's ability to move about the cab.

As shown in FIG. 2, a rubber pad 31 may be placed upon upper platform 28 for further operator comfort. As can be further seen, the switch will comfortably support the forearm 29 as explained below.

As shown in FIG. 2, neutral button 137 is provided on one side of paddle 26. Neutral button 37 may be actuated to request a movement to neutral.

As shown in FIG. 3A, module 20 may be pivoted to a lower, stowed position 39. By pushing in lock 36, an internal lock mechanism is actuated to release the lock.

As shown in FIG. 3A housing 24 includes an integral bushing 38 which rotates on bar 34. Lock mechanism 36 and an associated end portion 39 can move within bar 34.

As shown in FIG. 3B, end portion 37 includes structure for locking bushing at the operative or stowed positions. A pin 41 selectively moves into openings 43 in bushing 38 to lock housing 24 at the two positions. Only one opening 43 is illustrated, but it should be understood that another opening 43 is spaced by 180° from the illustrated opening. A spring bias part 36 and 37 to the left is shown in FIG. 3A. When the part 36 is forced into bar 34, against the spring force, part 37 moves to the right, and pin 41 moves out of opening 42. This allows pivoting of the module housing 24 between the positions shown in FIG. 2 and FIG. 3A.

Note that the movement is independent of the arm rest. While one method of locking module is shown, the details of how the module is locked and released are achievable by a worker of ordinary skill in this art. These details form no portion of this invention. A worker of ordinary skill in the art would be able to design a simple locking mechanism that allows the bushing 38 of the switch 22 to rotate on the bar 34. It is the concept of locking and providing a stowed position which is inventive.

As shown in FIG. 4, module 20 is provided with a plurality of additional input and display members. As shown, cruise control buttons 42 may be provided on the operator side of the housing.

Positioning the cruise control buttons at this location make actuation of cruise control much more convenient then in the prior art. A limp-home switch 40 is provided on the rear of the module 22. The limp-home switch only becomes operative when the automated shift system is not functioning. The limp-home switch may then be moved to a forward, neutral or reverse position. In these positions, the switch achieves a low forward gear, neutral or reverse, allowing the operator to drive the truck even after failure of the automated system.

A skip shift button 44 allows the operator to request a skip shift either upwardly or downwardly in conjunction with the actuation of the paddle 26. Display lights 48 show the state of the vehicle (i.e. forward, neutral or reverse).

As shown in FIG. 5, when mechanism 20 is in its operative position, it could restrict movement of the operator from the seat into the remainder of the cab. Thus, module 20 is moved to position 39 such as is shown FIG. 6. As can be appreciated, in this position the switch is not in the operator's way.

As shown in FIG. 7, paddle 26 has a lower portion 50 extending into the housing 24 through a slot 52 which approximates the lateral dimension of portion 50. In this way, it is clear that paddle 26 is only intended to be rocked forwardly or rearwardly. Springs 60 bias the paddle 26 to a centered position. The details of this structure are well within the skill of a worker in the art, and form no portion of this invention. Thus, the springs are shown schematically. However, the provision of a paddle having a portion 50 received in the slot 52 such that it cannot be moved laterally is inventive. This prompts the operator to only move the paddle forwardly or rearwardly.

The controls necessary to achieve all of the automated shifts described above are well within the skill of a worker in this art. The main inventive aspects of this invention go to the design and operation of the shift input module. While several of the functional and operational characteristics of the system (i.e., controls, springs, etc.) are disclosed schematically, a worker of ordinary skill in the art would be able to easily design appropriate systems to provide these functions.

A preferred embodiment of this invention has been disclosed, however, a worker of ordinary skill in the art would recognize that certain modifications come within the scope of this invention. For that reason, the following claims should be studied to determine the true scope and content of this invention.

What is claimed is:

1. A vehicle cab comprising:

a vehicle seat;

a shift input module for requesting shifts of a transmission mounted on a vehicle; and an armrest attached to said vehicle seat, said module being positioned at an operative position wherein it is accessible to an operator, and said module being movable to a stowed position wherein it is less accessible, said module being movable independently of said armrest, said module being provided with an upper platform and a paddle, said paddle being movable to request shifts, and said paddle being positioned slightly forwardly of said upper platform, said upper platform for supporting an operator's forearm, said armrest being at an approximately equal vertical position to said upper platform, said paddle being at a location.

2. A vehicle as recited in claim 1, wherein said module is provided with buttons to actuate or request additional functions on each of two lateral sides of said paddle.

3. A vehicle as recited in claim 1, wherein said module also includes cruise control actuation buttons.

4. A vehicle as recited in claim 1, wherein a rubber pad is positioned on said upper platform.

* * * * *